US009286017B2

(12) United States Patent
Oike

(10) Patent No.: US 9,286,017 B2
(45) Date of Patent: Mar. 15, 2016

(54) TECHNIQUE FOR DISPLAYING THUMBNAIL IMAGES ON AN INFORMATION PROCESSING DEVICE

(71) Applicant: BROTHER KOGYO KABUSHIKI KAISHA, Nagoya, Aichi (JP)

(72) Inventor: Jun Oike, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/602,465

(22) Filed: Jan. 22, 2015

(65) Prior Publication Data

US 2015/0205557 A1   Jul. 23, 2015

(30) Foreign Application Priority Data

Jan. 22, 2014   (JP) ................................. 2014-009600

(51) Int. Cl.
| G06F 15/00 | (2006.01) |
| G06F 3/12 | (2006.01) |
| G06K 1/00 | (2006.01) |
| H04L 29/08 | (2006.01) |
| G06K 15/00 | (2006.01) |

(52) U.S. Cl.
CPC ............ *G06F 3/1292* (2013.01); *G06F 3/1204* (2013.01); *G06F 3/129* (2013.01); *G06F 3/1256* (2013.01); *G06F 3/1259* (2013.01); *G06F 3/1287* (2013.01); *G06K 15/007* (2013.01); *H04L 67/02* (2013.01); *H04L 67/10* (2013.01); *H04L 67/125* (2013.01); *H04L 67/36* (2013.01)

(58) Field of Classification Search
USPC .................................................... 358/1.1–1.18
See application file for complete search history.

(56) References Cited

U.S. PATENT DOCUMENTS

| 2003/0231345 | A1 | 12/2003 | Azami | |
| 2009/0165115 | A1* | 6/2009 | Toumura et al. | ................. 726/12 |
| 2009/0240703 | A1* | 9/2009 | Yoshino | ......................... 707/10 |

FOREIGN PATENT DOCUMENTS

JP   2003-285475 A   10/2003

* cited by examiner

*Primary Examiner* — Douglas Tran
(74) *Attorney, Agent, or Firm* — Scully, Scott, Murphy & Presser, PC

(57) ABSTRACT

An information processing device may receive a file selecting operation for selecting a particular file, and send the selected particular file and a registering request to a first server, the file information including identification information for identifying the selected particular file. The information processing device may obtain thumbnail image data of the selected particular file, receive the identification information from the first server, store the thumbnail image data and the identification information in association with one another, receive a first access operation for accessing K items of file information, send, to the first server, a first access request for accessing the K items of file information, so as to receive, from the first server, K items of the identification information, and display K items of thumbnail images.

9 Claims, 8 Drawing Sheets

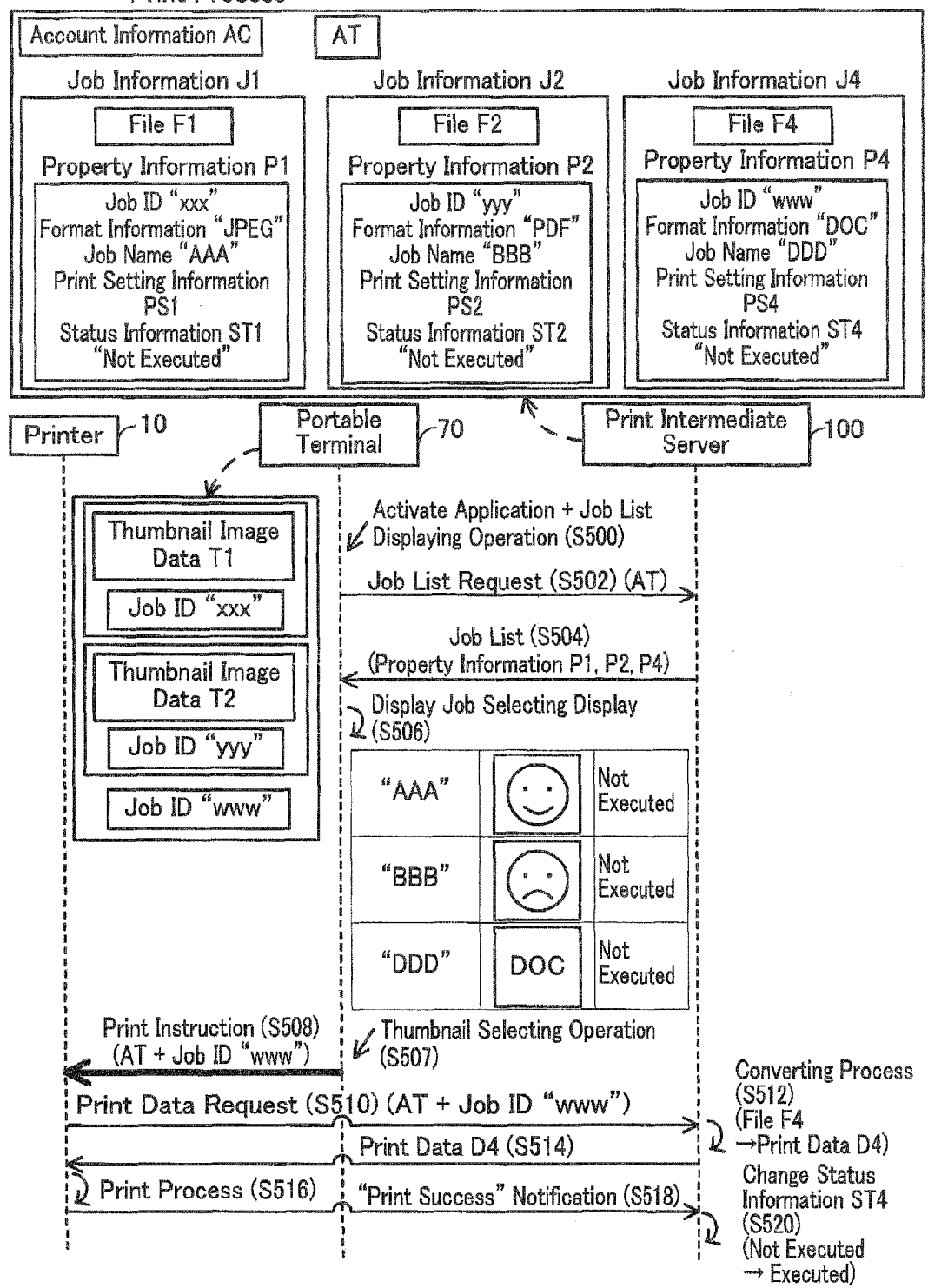
FIG. 7 (Case B) Print Process

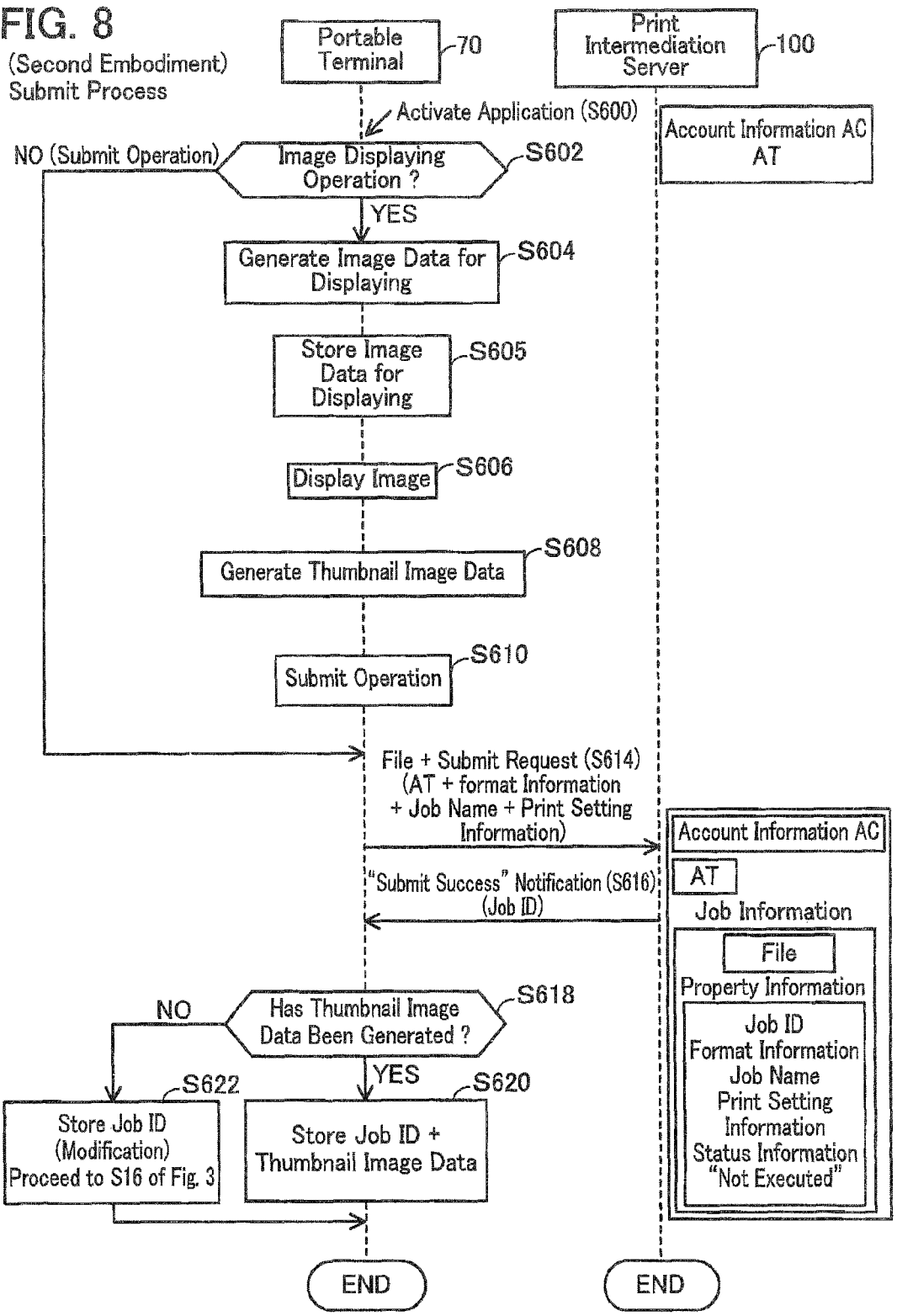

TECHNIQUE FOR DISPLAYING THUMBNAIL IMAGES ON AN INFORMATION PROCESSING DEVICE

CROSS-REFERENCE TO RELATED APPLICATION

This application claims priority to Japanese Patent Application No. 2014-009600, filed on Jan. 22, 2014, the contents of which are hereby incorporated by reference into the present application.

TECHNICAL FIELD

The present specification discloses a technique for an information processing device to register a file in a server and to display a thumbnail image corresponding to the file.

DESCRIPTION OF RELATED ART

A print system including a printer and a computer is known. When receiving a print job registration command and print data from the computer, the printer generates a thumbnail image data, and associates the print data with the thumbnail image data and stores them. Then, when receiving a thumbnail display command from the computer, the printer generates image data for displaying a thumbnail list, and sends the image data to the computer. When receiving the image data, the computer displays a thumbnail list.

SUMMARY

In the technique described above, the computer must receive the image data representing the thumbnail image from the printer in order to display the thumbnail image corresponding to the print data registered in the printer. However, in a case where the printer is not capable of generating image data representing the thumbnail image, the computer cannot display the thumbnail image.

The present specification provides a technique whereby a thumbnail image can be displayed by an information processing device even if a first server is not capable of generating thumbnail image data.

One aspect disclosed in the present specification may be a non-transitory computer-readable storage medium storing computer-readable instructions for an information processing device. The computer-readable instructions, when executed by a processor of the information processing device, may cause the information processing device to perform: receiving a file selecting operation for selecting a particular file from among one or more files in a memory of the information processing device; sending the selected particular file and a registering request to a first server via the Internet, the registering request indicating a request for registering file information in the first server, the file information being generated by the first server which received the registering request, the file information including identification information for identifying the selected particular file; obtaining thumbnail image data of the selected particular file; receiving the identification information from the first server via the Internet on a condition that the registering request has been sent to the first server; storing the thumbnail image data and the identification information in the memory in association with one another; receiving a first access operation for accessing K items of file information registered in the first server, while the K items of file information are registered in the first server, the K being an integer of one or more; in response to receiving the first access operation, sending, to the first server via the Internet, a first access request for accessing the K items of file information registered in the first server; in response to sending the first access request, receiving, from the first server, K items of the identification information included in the K items of file information registered in the first server; and in response to receiving the K items of identification information, retrieving the K items of thumbnail image data stored in the memory in association with the K items of identification information and controlling a displaying unit of the information processing device to display a first screen including K items of thumbnail images represented by the retrieved K items of thumbnail image data.

An information processing device realized by the above computer-readable instructions is also novel and useful. Moreover, a control method for controlling the information processing device by the above computer-readable instructions is also novel and useful.

BRIEF DESCRIPTION OF THE DRAWINGS

FIG. 7 illustrates a sequence diagram of a print process of case B; and

FIG. 8 illustrates a sequence diagram of a submit process of a second embodiment.

EMBODIMENT

Figure 1:
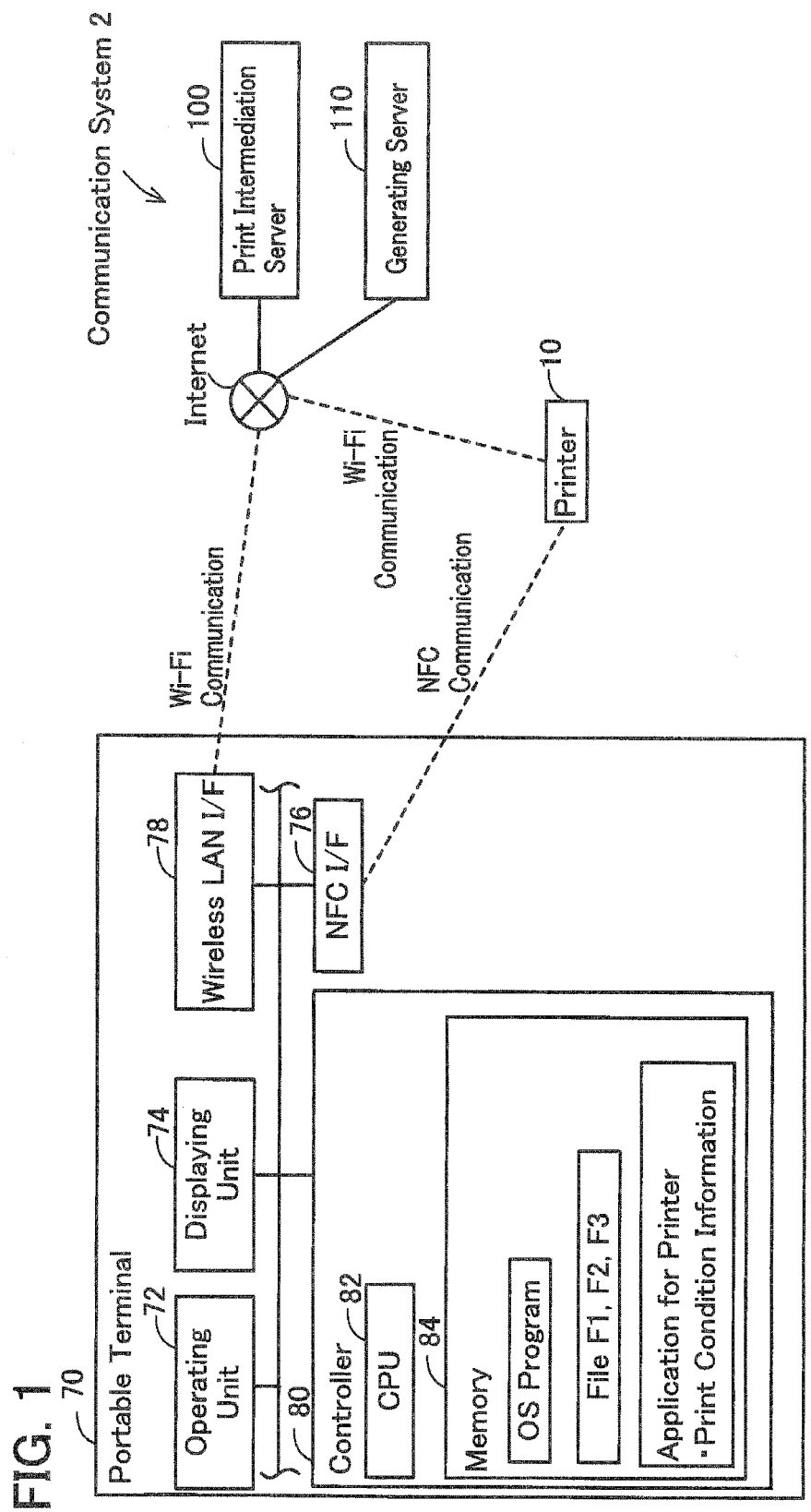
FIG. 1 illustrates a configuration of a communication system.

First Embodiment (Configuration of Communication System 2; FIG. 1)

A communication system 2 comprises a printer 10, a portable terminal 70, a print intermediation server 100, and a generating server 110. The devices 10, 70, 100, 110 are capable of communicating with one another via the Internet. Further, the printer 10 and the portable terminal 70 are capable of communicating with one another not via the Internet but by using a wireless communication (referred to as "NFC communication" below) in accordance with an NFC (abbreviation of Near Field Communication) scheme.

(Configuration of Portable Terminal 70)

The portable terminal 70 is a portable terminal device such as a mobile telephone (e.g. a smartphone), a PDA, a notebook PC, a tablet PC, a portable music playback device or a portable video playback device. The portable terminal 70 comprises an operating unit 72, a displaying unit 74, an NFC interface 76, a wireless LAN (abbreviation of Local Area Network) interface 78 and a controller 80. Each of the units 72 to 80 is connected to a bus line (a reference numeral is not illustrated). Hereinafter, the interface will be described as an "I/F".

The operating unit 72 includes a plurality of keys. A user can give various instructions to the portable terminal 70 by operating the operating unit 72. The displaying unit 74 is a display for displaying various items of information. The displaying unit 74 functions as a so-called touch panel. Consequently, the user can give various instructions to the portable terminal 70 by touching the displaying unit 74.

The NFC I/F 76 is an I/F (i.e., an IC chip or a communication circuit) for executing an NFC communication. The NFC scheme, for example, is a wireless communication scheme based on an international standard of e.g., ISO/IEC 21481 or 18092.

The wireless LAN I/F 78 is an I/F (i.e. an IC chip or a communication circuit) for executing a wireless communication in accordance with a Wi-Fi scheme defined by the Wi-Fi Alliance (Referred to as a "Wi-Fi communication" below. Wi-Fi is a registered trademark of Wi-Fi Alliance.). The Wi-Fi scheme herein, for example, is a wireless communication scheme based on the standard of 802.11 of IEEE (abbreviation of The Institute of Electrical and Electronics Engineers, Inc.) or a standard (e.g., 802.11a, 11b, 11g, 11n, etc.) equivalent to this standard. Moreover, in a modification, the wireless LAN I/F 78 may not be an I/F for executing a Wi-Fi communication, but may be, for example, an I/F for executing a wireless communication in accordance with 3G, 4G and the like.

A communication speed of a wireless communication via the wireless LAN I/F 78 (e.g., a maximum communication speed is 11 to 600 Mbps) is faster than a communication speed of a wireless communication via the NFC I/F 76 (e.g., a maximum communication speed is 106 to 424 kbps). A frequency of a carrier wave (e.g., a 2.4 GHz band, a 5.0 GHz band) upon a wireless communication via the wireless LAN I/F 78 is different from a frequency of a carrier wave (e.g. a 13.56 MHz band) upon a wireless communication via the NFC I/F 76. Further, a maximum distance (e.g., 100 m) at which a wireless communication can be executed via the wireless LAN I/F 78 is greater than a maximum distance (e.g., 10 cm) at which a wireless communication can be executed via the NFC I/F 76.

The controller 80 includes a CPU 82 and a memory 84. The CPU 82 is a processor which executes various processes in accordance with an OS (abbreviation of Operating System) program stored in the memory 84. The memory 84 is configured by a RAM, a ROM, and the like. The memory 84 further stores a plurality of files F1 to F3, and an application for printer (referred to as "printer application" below).

The files F1 to F3 may be files having any type of file format, and may be, for example, files having JPEG (abbreviation of Joint Photographic Experts Group) format, GIF (abbreviation of Graphics Interchange Format) format, PNG (abbreviation of Portable Network Graphics) format, PDF (abbreviation of Portable Document Format) format, or DOC (abbreviation of Document) format, etc.

The printer application is an application for causing the printer 10 to execute printing print by using the print intermediation server 100. The printer application is an application provided by a vendor or manufacturer of the printer 10. The printer application may be installed to the portable terminal 70 from a server on the Internet or may be installed to the portable terminal 70 from a medium shipped together with the printer 10.

The printer application includes print condition information which indicates print conditions available to the printer 10. The print condition information includes sheet size information and color number information (information on a number of colors). The sheet size information included in the print condition information indicates all sizes of "A3" or less, e.g., A sizes such as "A4", "A5", B sizes such as "B4", "B5", legal size, letter size, etc. Further, the color number information included in the print condition information indicates "Color print" and "Monochrome print".

(Configuration of Printer 10)

The printer 10 is a peripheral apparatus (i.e., peripheral apparatus of a PC or the like) which can execute a print function. The printer 10 is capable of executing an NFC communication and a Wi-Fi communication.

(Configuration of Print Intermediation Server 100)

The print intermediation server 100 is a server which is located on the Internet, and is a server provided by the vendor of the printer 10. In this regard, however, in a modification, the print intermediation server 100 may be a server provided by a business operator different from the vendor of the printer 10.

The print intermediation server 100 is a server for executing an intermediation of a print between an external apparatus (e.g. the portable terminal 70) and a printer (e.g. the printer 10). That is, the print intermediation server 100 converts a file submitted from the external apparatus, generates print data having a data format which can be interpreted by the printer, and supplies the print data to the printer. Therefore, even when the external apparatus does not have a printer driver for converting the file into the print data, the external apparatus can cause the printer to execute printing by submitting the file to the print intermediation server 100.

(Configuration of Generating Server 110)

The generating server 110 is a server which is located on the Internet, and is a server provided by the vendor of the printer 10. In this regard, however, in a modification, the generating server 110 may be, for example, a server provided by a business operator different from the vendor of the printer 10.

The generating server 110 is a server for generating thumbnail image data. The generating server 110 generates the thumbnail image data by using a file received from an external apparatus (e.g., the portable terminal 70), and sends the thumbnail image data to the external apparatus. Consequently, in a case where the external apparatus cannot generate thumbnail image data by using a file, the external apparatus can obtain the thumbnail image data from the generating server 110. Moreover, the thumbnail image data is data representing the same image as an image represented by an original file of the thumbnail image data, and is data having a smaller data size than the original file.

In the present embodiment, the generating server 110 can generate thumbnail image data from a file having GIF format, PNG format, or PDF format, but cannot generate thumbnail image data from a file having DOC format. Further, since in the present embodiment, the portable terminal 70 can generate thumbnail image data from a file having JPEG format, the generating server 110 cannot be in a situation of generating thumbnail image data from a file having JPEG format.

(Advance Preparation)

The user of the portable terminal 70 performs the following advance preparation to cause the printer 10 to execute printing by using the print intermediation server 100. That is, the user of the portable terminal 70 registers account information AC in the print intermediation server 100 by using the portable terminal 70. The account information AC includes, for example, user ID, password, and the like. The print intermediation server 100 generates an AT (abbreviation of Authentication (or Access) Token) which is a unique token (i.e., character string), and registers the account information AC and the AT in association with one another. Then, the print intermediation server 100 sends the generated AT to the portable terminal 70. When receiving the AT from the print intermediation server 100, the CPU 82 of the portable terminal 70 stores the AT in the memory 84.

Figure 2:
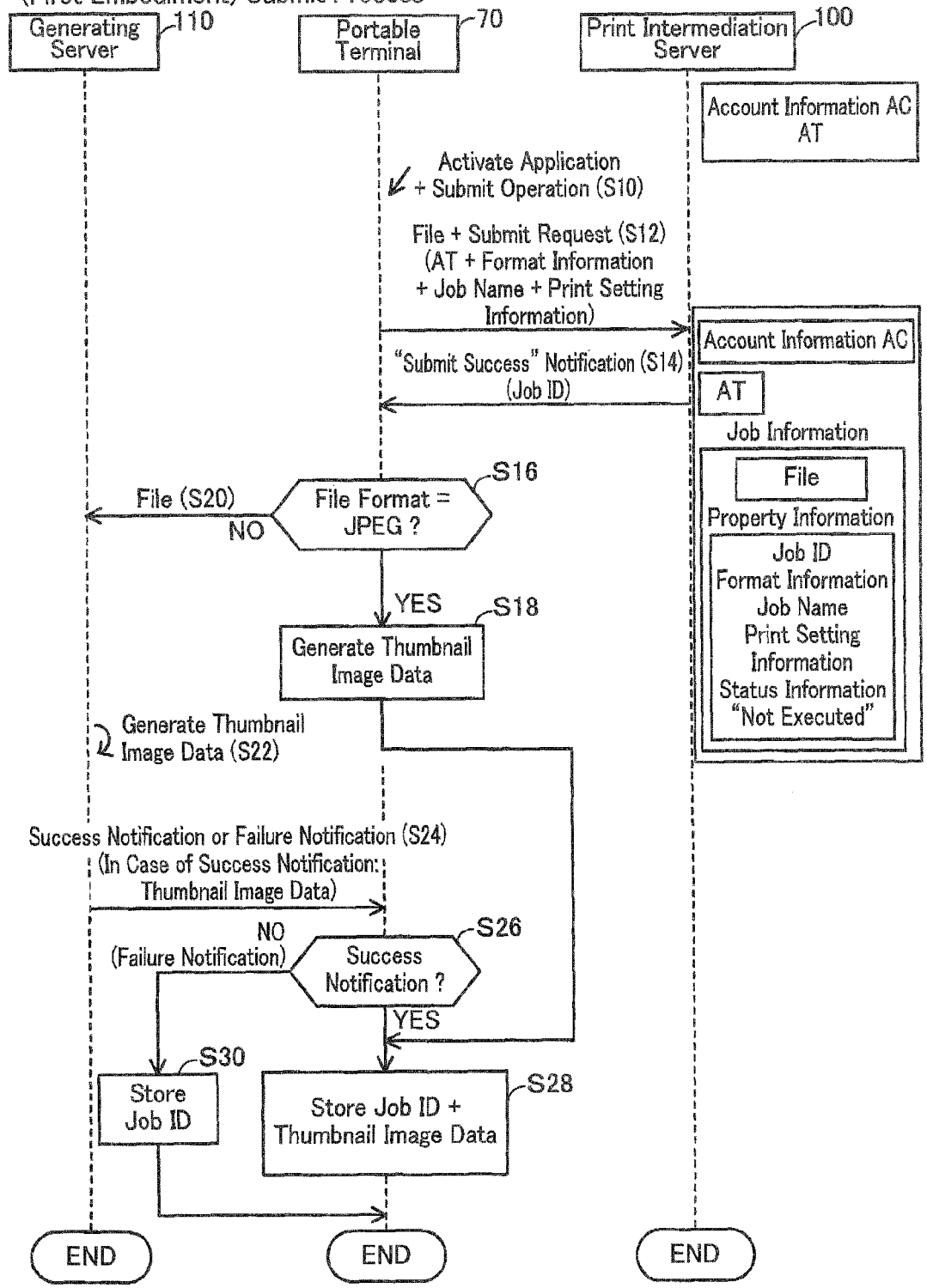
FIG. 2 illustrates a sequence diagram of a submit process of a first embodiment.

(Submit Process; FIG. 2)

Next, a submit process for the portable terminal 70 to submit (i.e., register) a file representing a print target image to the print intermediation server 100 will be described with reference to FIG. 2. In the submit process, a file is submitted (i.e., sent) from the portable terminal 70 to the print intermediation server 100, and consequently the file is registered in the print intermediation server 100.

In S10, in a case where the user of the portable terminal 70 desires to submit one file from among the files F1 to F3 in the memory 84 to the print intermediation server 100, the user activates the printer application, and performs a submit operation. The submit operation includes selecting a button indicating "Submit" on a screen displayed in accordance with the printer application, selecting one file, inputting any job name, and selecting any print setting. The print setting is sheet size (e.g., "A4") and color number (e.g., "Color print"), which are selected within the range of the print condition information included in the printer application In case of receiving the submit operation, the CPU 82 of the portable terminal 70 executes each of the processes from S12 onwards in accordance with the printer application.

In S12, the CPU 82 of the portable terminal 70 sends the selected file and a submit request to the print intermediation server 100 via the wireless LAN I/F 78. The submit request includes the AT in the memory 84, format information indicating the file format of the selected file, the inputted job name, and the print setting information indicating the selected print setting.

When receiving the selected file and the submit request from the portable terminal 70, the print intermediation server 100 executes authentication of the AT included in the submit request. In a case where the authentication of the AT succeeds, the print intermediation server 100 generates job information. The job information includes the selected file received with the submit request, and property information. The property information includes job ID, each of the items of information (i.e., format information, job name, print setting information) included in the submit request, and status information. The job ID is identification information for identifying the print job, in other words, is identification information for identifying the selected file included in the submit request. The status information is information indicating a progress status of a print of an image based on the selected file, and indicates "Not-Executed (i.e., prior to executing a print)" at the time the job information is generated. The print intermediation server 100 registers the generated job information, the account information AC, and the AT in association with one another.

In S14, the CPU 82 of the portable terminal 70 receives a submit success notification from the print intermediation server 100 via the wireless LAN I/F 78. The submit success notification includes the job ID included in the job information registered in the print intermediation server 100.

In S16, the CPU 82 of the portable terminal 70 determines whether the file format of the selected file is JPEG or not. In a case where the file format of the selected file is JPEG, the CPU 82 determines YES in S16, and proceeds to S18, and in a case where the file format of the selected file is a format other than JPEG (e.g., GIF, PNG, PDF, DOC and the like), the CPU 82 determines NO in S16, and proceeds to S20.

In S18, the CPU 82 of the portable terminal 70 generates thumbnail image data from the selected file. Specifically, the CPU 82 generates the thumbnail image data by thinning out some of the pixels of the plurality of pixels configuring the selected file. Thereby, the thumbnail image data is generated, which is thumbnail image data representing an image the same as the image represented by the selected file and having a smaller data size than the selected file. When S18 is completed, the process proceeds to S28.

In S20, the CPU 82 of the portable terminal 70 sends the selected file to the generating server 110 via the wireless LAN I/F 78 in order to cause the generating server 110 to generate the thumbnail image data.

In S22, in a case where the file format of the selected file is GIF format, PNG format, or PDF format, the generating server 110 generates thumbnail image data from the selected file. In this case, the generating server 110 sends a success notification including the generated thumbnail image data to the portable terminal 70. However, in a case where the file format of the selected file is DOC format, the generating server 110 cannot generate thumbnail image data. In this case, the generating server 110 sends a failure notification to the portable terminal 70.

In S24, the CPU 82 of the portable terminal 70 receives the success notification or failure notification from the generating server 110 via the wireless LAN I/F 78.

In S26, the CPU 82 of the portable terminal 70 determines whether a success notification has been received from the generating server 110 or not. In a case of receiving a success notification from the generating server 110, the CPU 82 determines YES in S26, and proceeds to S28, and in a case of receiving a failure notification from the generating server 110, the CPU 82 determines NO in S26, and proceeds to S30.

At a stage where S28 is executed, the CPU 82 of the portable terminal 70 has generated thumbnail image data from the selected file (S18), or received the success notification including the thumbnail image data (YES in S26). That is, the CPU 82 has obtained the thumbnail image data. In S28, the CPU 82 stores, in the memory 84 in association with one another, the job ID included in the submit success notification of S14 and the obtained thumbnail image data.

On the other hand, at a stage where S30 is executed, the CPU 82 of the portable terminal 70 has not obtained the thumbnail image data. Consequently, in S30, the CPU 82 stores only the job ID included in the submit success notification of S14, without associating the job ID with the thumbnail image data, in the memory 84.

Figure 3:
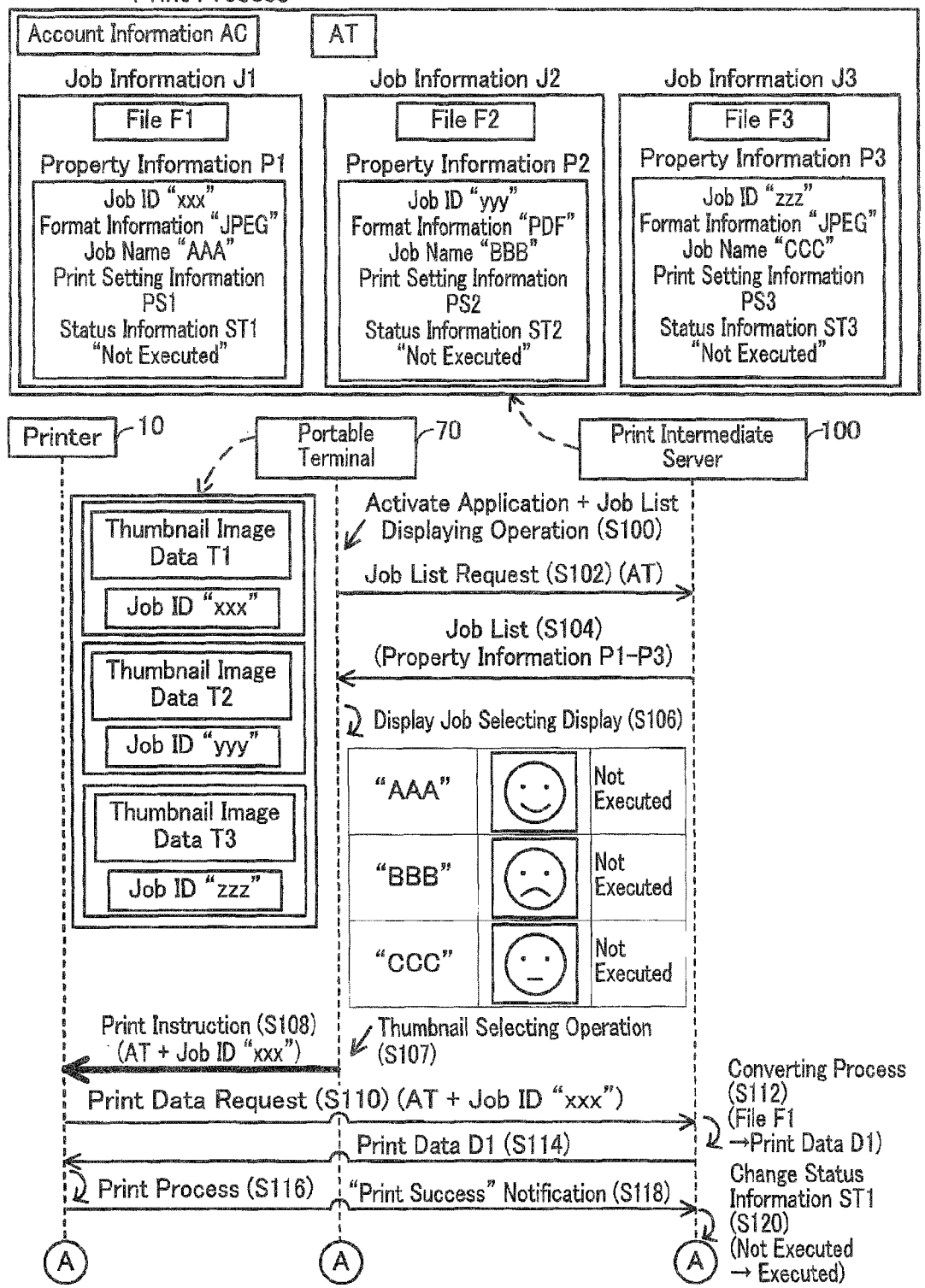
FIG. 3 illustrates a sequence diagram of a print process of case A.

(Print Process of Case A; FIG. 3)

Next, a print process for the portable terminal 70 to cause the printer 10 to execute printing in case A will be described with reference to FIG. 3. In FIG. 3, thick arrows and thin arrows indicate a NFC communication and a Wi-Fi communication, respectively.

The submit process of FIG. 2 is executed three times before the print process of case A is executed. As a result, the account information AC, the AT, and three items of job information J1, J2, J3 have been registered in the print intermediation server 100 in association with one another. Each item of job information J1, J2, J3 includes one file (i.e., F1, F2, F3) and one item of property information (i.e., P1, P2, P3). The file format of the files F1, F3 is JPEG, and the file format of the file F2 is PDF. Each item of property information P1, P2, P3 includes the job ID (i.e., "xxx", "yyy", "zzz"), format information (i.e., "JPEG", "PDF"), job name (i.e., "AAA", "BBB", "CCC"), print setting information (i.e., PS1, PS2, PS3), and the status information (i.e., ST1, ST2, ST3). The status information of any of the items of property information P1, P2, P3 indicates "Not Executed".

Further, due to the submit process having been executed three times, thumbnail image data T1 corresponding to the file F1 and the job ID "xxx" is stored in the memory 84 of the portable terminal 70 in association with one another, thumbnail image data T2 corresponding to the file F2 and the job ID "yyy" is stored in the memory 84 of the portable terminal 70 in association with one another, and thumbnail image data T3 corresponding to the file F3 and the job ID "zzz" is stored in the memory 84 of the portable terminal 70 in association with one another.

In S100, in case of desiring to cause the printer 10 to execute printing, the user of the portable terminal 70 activates the printer application and performs a job list displaying operation. The job list displaying operation includes selecting a button indicating "Job list display" on a screen displayed in accordance with the printer application. In a case where the job list displaying operation is received, the CPU 82 of the portable terminal 70 executes processes from S102 onward in accordance with the printer application.

In S102, the CPU 82 of the portable terminal 70 sends a job list request including the AT in the memory 84 to the print intermediation server 100 via the wireless LAN I/F 78. As a result, in S104, the CPU 82 receives a job list from the print intermediation server 100 via the wireless LAN I/F 78. The job list includes the three items of property information P1 to P3 included in the three items of job information J1 to J3 associated with the AT in the job list request of S102. Thus, since the portable terminal 70 can access the three items of property information P1 to P3 included in the three items of job information J1 to J3, the job list display operation of S100 and the job list request of S102 can be referred to as an operation and a request, respectively, for accessing the three items of job information J1 to J3.

In S106, the CPU 82 of the portable terminal 70 generates job selecting screen data by using the job list. Specifically, the CPU 82 first generates associated data by using the property information P1 in the job list. That is, the CPU 82 retrieves from the memory 84 the thumbnail image data T1 associated with the job ID "xxx" in the property information P1. Then, the CPU 82 generates associated data in which the job name "AAA" in the property information P1, the obtained thumbnail image data T1, and the status information ST1 "Not Executed" in the property information P1 are associated with one another (i.e., associated data for displaying these items of information in horizontal alignment). Similarly, by using the property information P2, the CPU 82 generates associated data in which the job name "BBB", the thumbnail image data T2, and the status information ST2 Not Executed" are associated with one another and, further, by using the property information P3, generates associated data in which the job name "CCC", the thumbnail image data T3, and the status information ST3 "Not Executed" are associated with one another. The CPU 82 generates job selecting screen data including all the items of associated data described above, and supplies the job selecting screen data to the displaying unit 74. Thereby, a job selecting screen illustrated in S106 of FIG. 3 is displayed in the displaying unit 74. The user of the portable terminal 70 can easily learn the contents of the job information J1 to J3 registered in the print intermediation server 100 by looking at the thumbnail images and the job names in the job selecting screen. Further, the user can learn that printing of the images based on the files F1 to F3 has not yet been executed by looking at the status information "Not Executed" in the job selecting screen.

In S107, in case of desiring to cause the printer 10 to execute printing of an image based on the file F1, the user of the portable terminal 70 executes a thumbnail selecting operation for selecting a thumbnail image represented by the thumbnail image data T1 (i.e., the thumbnail image in the uppermost column of the job selecting screen of FIG. 3). Thereby, the CPU 82 of the portable terminal 70 receives the thumbnail selecting operation.

Next, although not illustrated, the CPU 82 of the portable terminal 70 causes the displaying unit 74 to display a message prompting the portable terminal 70 to be brought closer to the printer 10. Thereby, the user of the portable terminal 70 brings the portable terminal 70 closer to the printer 10. As a result, an NFC connection is established between the NFC I/F 76 of the portable terminal 70 and an NFC I/F (not illustrated) of the printer 10.

In S108, the CPU 82 of the portable terminal 70 sends a print instruction to the printer 10 via the NFC I/F 76. The print instruction includes the AT in the memory 84, and the job ID "xxx" in the memory 84 in association with the thumbnail image data T1 representing the selected thumbnail image.

In S110, when receiving the print instruction from the portable terminal 70, the printer 10 sends a print data request to the print intermediation server 100 by using a Wi-Fi communication. The print data request includes the AT and the job ID "xxx" included in the print instruction.

When receiving the print data request from the printer 10, the print intermediation server 100 executes authentication of the AT included in the print data request. Then, in a case where the authentication of the AT succeeds, the print intermediation server 100 executes the process of S112. In S112, the print intermediation server 100 extracts the file F1 associated with the job ID "xxx" included in the print data request. Then, the print intermediation server 100 executes a converting process on the extracted file F1, generating print data D1 having a predetermined data format. The predetermined data format may be any data format which can be interpreted (i.e., capable of being printed) by the printer 10. Further, the print intermediation server 100 converts the file F 1 in accordance with the print setting information PS1 in the property information P1 associated with the extracted file F1, thus generating the print data D1. For example, in a case where the print setting information PS1 indicates sheet size "A4" and number of colors "Monochrome print", the print intermediation server 100 generates the print data D1 for executing a print of a monochrome image on an A4 print sheet. Next, in S114, the print intermediation server 100 sends the print data D1 to the printer 10.

In S116, when receiving the print data D1 from the print intermediation server 100 by using the Wi-Fi communication, the printer 10 prints the image represented by the print data D1 onto a print sheet. Thereby, the user of the portable terminal 70 can obtain a printed print sheet.

In S118, the printer 10 sends a "print success" notification, which indicates that printing of the image represented by the print data D1 succeeded, to the print intermediation server 100 by using the Wi-Fi communication.

In S120, when receiving the "print success" notification from the printer 10, the print intermediation server 100 changes the status information ST1 in the property information P1 included in the job information J1 from "Not Executed" to "Executed (i.e., after having executed printing)".

Figure 4:
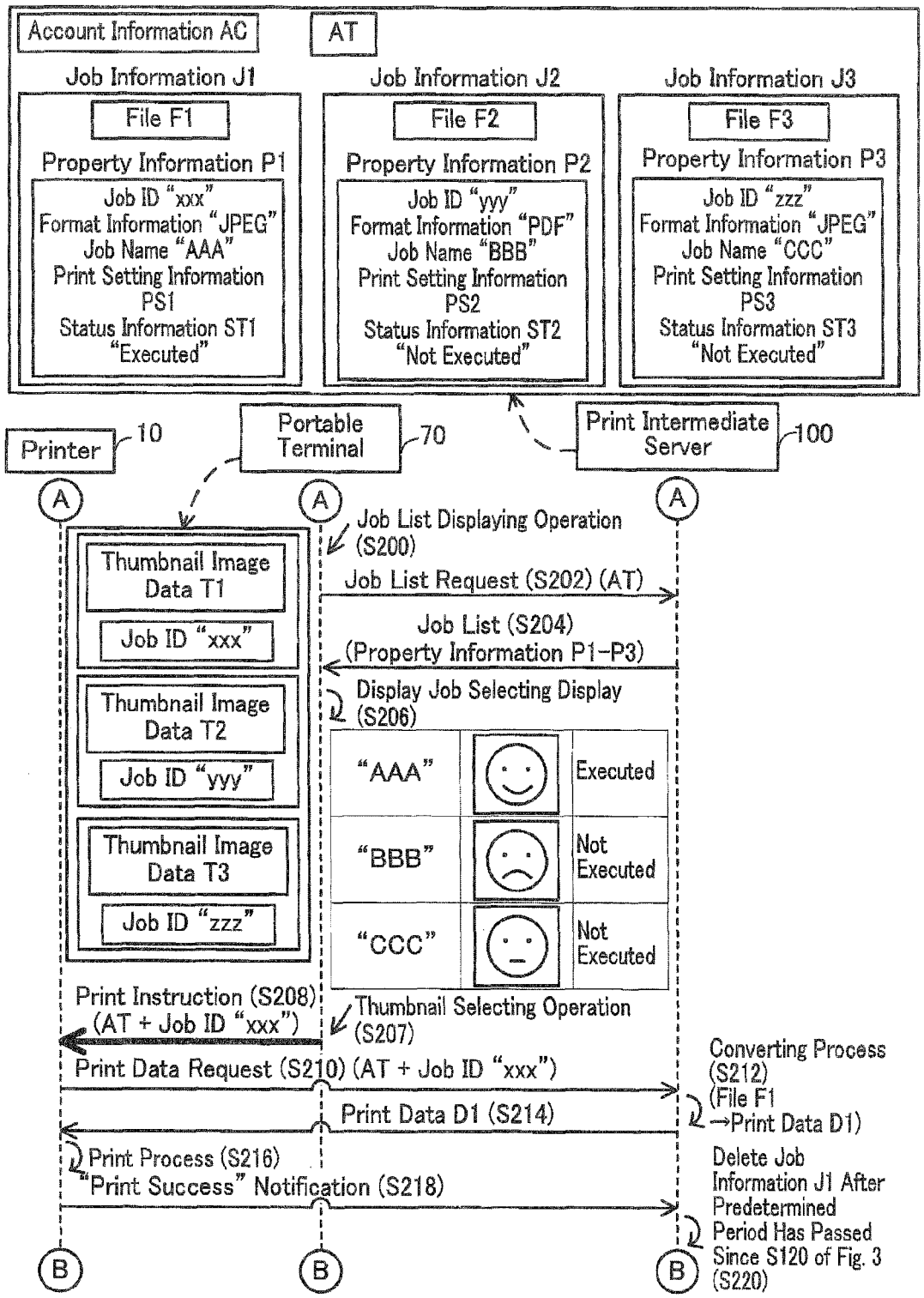
FIG. 4 illustrates a sequence diagram of a continuation of FIG. 3.

(Continuation of FIG. 3; FIG. 4)

Next, a continuation of the print process of FIG. 3 will be described with reference to FIG. 4. In an initial state of FIG. 4, the same items of information as the initial state of FIG. 3 have been registered in the print intermediation server 100. However, the status information ST1 in the property information P1 included in the job information J1 is "Executed" (see S120 of FIGS. 3).

S200 to S206 are the same as S100 to 106 of FIG. 3. However, since the status information ST1 is "Executed", "Executed" is displayed in association with the job name "AAA" in the job selecting screen displayed in S206.

S207 to S218 are the same as S107 to S118 of FIG. 3. That is, after the execution of printing of an image based on the file F1 (i.e., after the print process of FIG. 3), the user of the portable terminal 70 can again cause the printer 10 to execute printing of the image. However, since the status information ST1 is already "Executed", the print intermediation server 100 does not change the status information ST1 (i.e., does not execute the same process as S120 of FIG. 3) even when receiving the "print success" notification from the printer 10 in S218.

In S220, the print intermediation server 100 deletes the job information J1 (i.e., the file F1 and the property information P1) after a predetermined period has passed since the status information ST1 was changed from "Not Executed" to "Executed" (i.e., after a predetermined period has passed since S120 of FIG. 3). When the job information J1 has been deleted, the user becomes unable to cause the printer 10 to again execute printing of the image based on the file F1.

Figure 5:
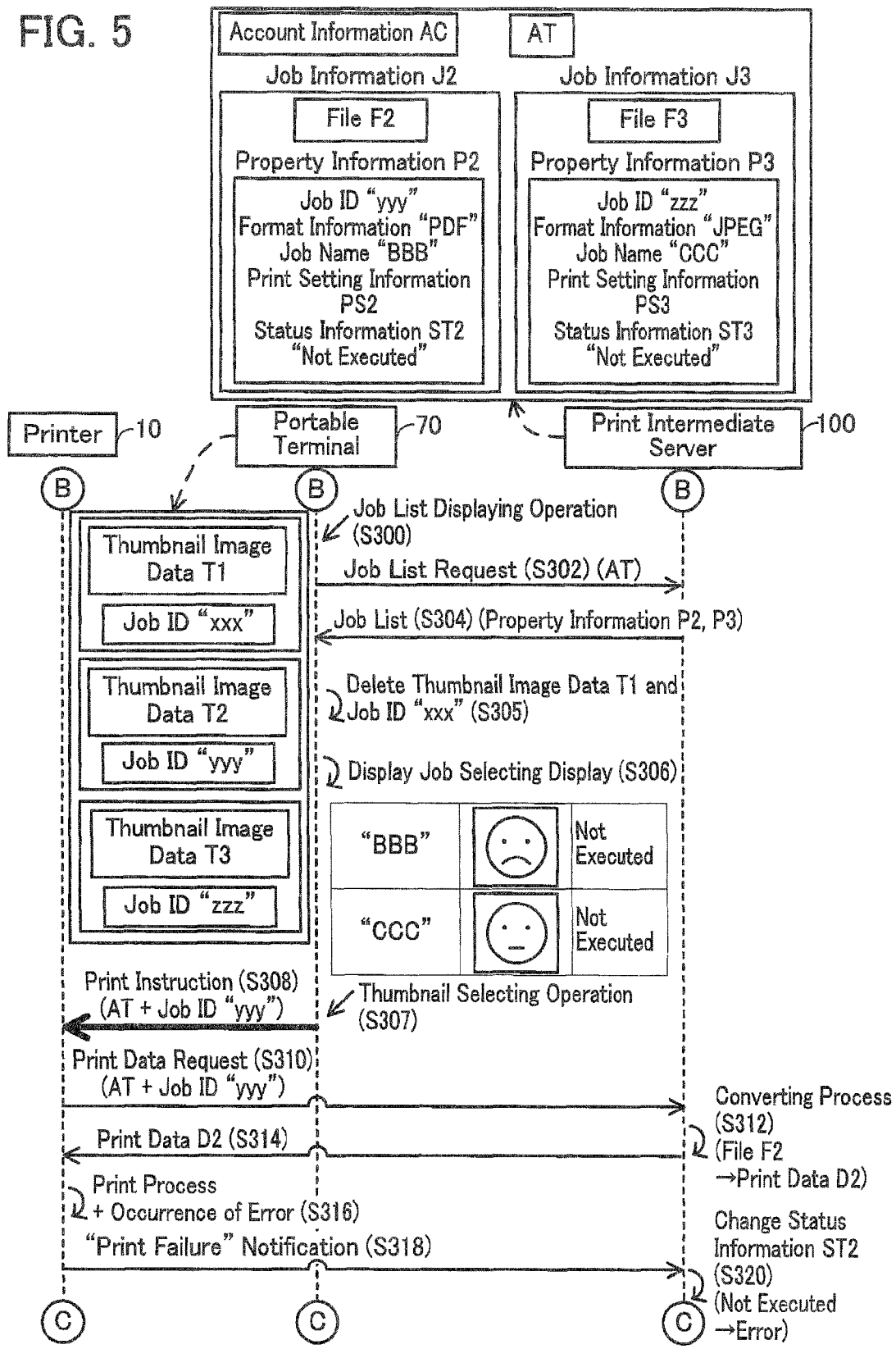
FIG. 5 illustrates a sequence diagram of a continuation of FIG. 4.

(Continuation of FIG. 4; FIG. 5)

Next, a continuation of the print process of FIG. 4 will be described with reference to FIG. 5. In an initial state of FIG. 5, the job information J1 has not been registered in the print intermediation server 100 (see S220 of FIG. 4), and the job information J2, J3 has been registered.

S300 to S304 are the same as S100 to 104 of FIG. 3. However, since the job information J1 has not been registered in the print intermediation server 100, a job list of S304 does not include the property information P1, and does include the property information P2, P3.

In S305, the CPU 82 of the portable terminal 70 determines that the two items of job ID "yyy", "zzz" in the two items of property information P2, P3 included in the job list, and the three items of job ID "xxx", "yyy", "zzz" in the memory 84 are not identical. That is, the CPU 82 can learn that the job ID "xxx" in the memory 84 is not included in the job list, that is, that the job information J1 that includes the job ID "xxx" has been deleted from the print intermediation server 100. In this case, the CPU 82 deletes the job ID "xxx" and the thumbnail image data T1 from the memory 84. Thereby, storage area in the memory 84 is released, and consequently the portable terminal 70 can store other information in that storage area.

Information related to the job name "AAA" is not displayed in the job selecting screen displayed in S306, and only information related to the job names "BBB", "CCC" is displayed.

In S307, in case of desiring to cause the printer 10 to execute printing of an image based on the file F2, the user of the portable terminal 70 executes a thumbnail selecting operation for selecting a thumbnail image represented by the thumbnail image data T2 (i.e., a thumbnail image in the uppermost column of the job selecting screen of FIG. 5). Thereby, the CPU 82 of the portable terminal 70 receives the thumbnail selecting operation.

S308 to S314 are the same as S108 to S114 of FIG. 3, with the exception that the target of the process is the job ID "yyy", the file F2, and print data D2.

In S316, when the print data D2 is received from the print intermediation server 100, the printer 10 attempts to print an image represented by the print data D2 onto a print sheet. However, in the case of FIG. 5, printing fails due to occurrence of an error, such as a paper jam in the printer 10, or the like.

In S318, the printer 10 sends, to the print intermediation server 100 by using the Wi-Fi communication, a "print failure" notification indicating that printing of the image represented by the print data D2 has failed.

In S320, when the "print failure" notification is received from the printer 10, the print intermediation server 100 changes the status information ST2 in the property information P2 included in the job information J2 from "Not Executed" to "Error".

Figure 6:
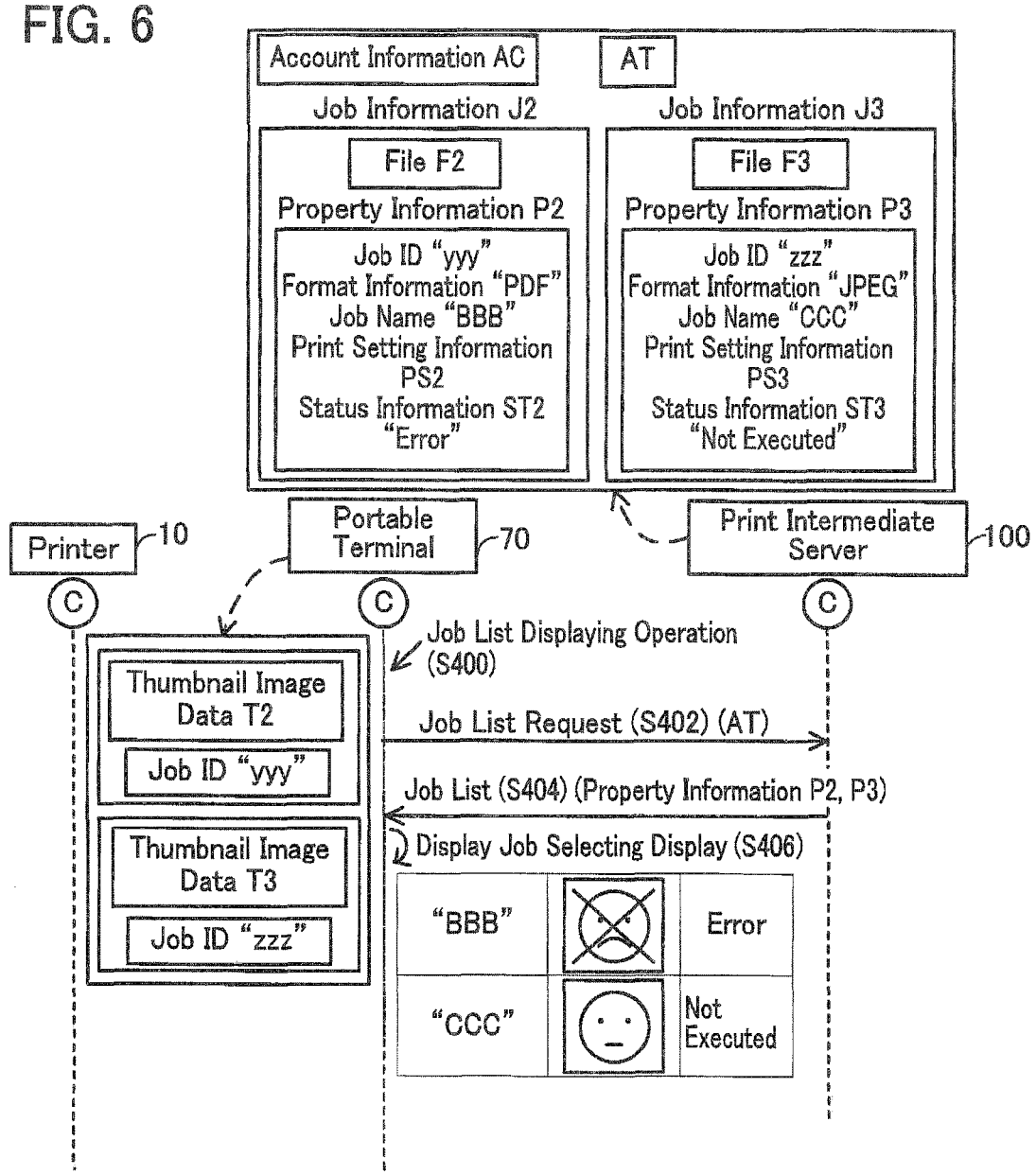
FIG. 6 illustrates a sequence diagram of a continuation of FIG. 5.

(Continuation of FIG. 5; FIG. 6)

Next, a continuation of the print process of FIG. 5 will be described with reference to FIG. 6. In an initial state of FIG. 6, the same items of information as in the initial state of FIG. 5 have been registered in the print intermediation server 100. However, the status information ST2 in the property information P2 included in the job information J2 is "Error" (see S320 of FIGS. 5).

S400 to S404 are the same as S300 to 304 of FIG. 5. S406 is the same as S306 of FIG. 5, but differing in the following respect. That is, since the status information ST2 is "Error", the CPU 82 of the portable terminal 70 synthesizes a predetermined mark on the thumbnail image data T2, generating synthesized image data. The predetermined mark may be any kind of mark as long as it indicates that printing has failed in the past, and is a mark indicating "X" in the example of FIG. 6. Then, the CPU 82 supplies the job selecting screen data including the synthesized image data to the displaying unit 74. Thereby, a thumbnail image including the mark indicating "X" is displayed in association with the job name "BBB" in the job selecting screen. Further, the status information "Error" is displayed in association with the job name "BBB" in the job selecting screen. The user of the portable terminal 70 can easily learn that printing of the image based on the file F2 has failed by looking at the information related to the job name "BBB" (i.e., the thumbnail image including the mark indicating "X" and the status information "Error"). Moreover, in a modification, the predetermined mark may be letters indicating "Error". Further, in another modification, instead of displaying a predetermined mark, the image represented by the thumbnail image data T2 may be displayed in a color different from other thumbnail images (i.e., an image represented by the thumbnail image data T3).

(Print Process of Case B; FIG. 7)

Next, a print process in which the portable terminal 70 causes the printer 10 to perform printing in case B will be described with reference to FIG. 7. In FIG. 7, description will focus on points differing from case A of FIGS. 3 to 6.

An initial state of FIG. 7 is the same as the initial state of FIG. 3, with the exception that job information J4 instead of the job information J3 has been registered in the print intermediation server 100. The job information J4 includes a file F4 and property information P4. The file format of the file F4 is DOC. The property information P1 includes a job ID "www", the format information "DOC", a job name "DDD", print setting information PS4, and status information ST4 "Not Executed".

Since the file format of the file F4 is "DOC", the portable terminal 70 cannot generate thumbnail image data from the file F4 (NO in S16 of FIG. 2), and also cannot generate thumbnail image data from the generating server 110 (failure notification in S24 of FIG. 2). Consequently, the CPU 82 of the portable terminal 70 cannot obtain thumbnail image data, and stores only the job ID "www" in the memory 84 not associated with thumbnail image data (S30 of FIGS. 2).

S500 to S504 are the same as S100 to 104 of FIG. 3. However, since the job information J4 instead of the job information J3 has been registered in the print intermediation server 100, a job list of S504 does not include the property information P3, but does include the property information P1, P2, P4.

In S506, the CPU 82 of the portable terminal 70 generates items of associated data by using the property information P1, P2 in the job list, as in S106 of FIG. 3. However, thumbnail image data associated with the job ID "www" included in the property information P4 in the job list has not been stored in the memory 84. Consequently, by using the property information P4, the CPU 82 generates associated data in which the job name "DDD", predetermined image data, and the status information ST4 "Not Executed" are associated with one another. The predetermined image data is image data included in advance in the printer application and, in the present embodiment, is image data indicating a character string "DOC", which is a data format which the portable terminal 70 and the generating server 110 cannot use to generate thumbnail image data. The CPU 82 supplies the job selecting screen data which includes the associated data described above to the displaying unit 74, and causes the displaying unit 74 to display a job selecting screen. The user of the portable terminal 70 can learn that the file F4 corresponding to the job name "DDD" is a file in DOC format by looking at the image represented by the predetermined image data in the job selecting screen. Moreover, in a modification, the predetermined image data may be, for example, image data representing a character string "NO IMAGE", meaning that a thumbnail image does not exist.

In S507, in case of desiring to cause the printer 10 to execute printing of an image based on the file F4, the user of the portable terminal 70 executes a thumbnail selecting operation for selecting an image represented by the predetermined image data (i.e., an image in the lowermost column of the job selecting screen of FIG. 7). Thereby, the CPU 82 of the portable terminal 70 receives the thumbnail selecting operation.

S508 to S520 are the same as S108 to S120 of FIG. 3 with the exception that the target of the process is the job ID "www", the file F4, print data D4 and the status information ST4.

Effect of Present Embodiment

According to the present embodiment, the portable terminal 70 can store, in the memory 84 in association with one another, thumbnail image data corresponding to a file registered in the print intermediation server 100, and the job ID for identifying that file (S28 of FIG. 2). Consequently, even though a communication of the thumbnail image data with the print intermediation server 100 is not executed, the portable terminal 70 can display a thumbnail image by using the thumbnail image data in the memory 84 (S106 of FIG. 3) in a case of receiving property information including a job ID from the print intermediation server 100. Consequently, the portable terminal 70 can display a thumbnail image even when the print intermediation server 100 is not capable of generating thumbnail image data. Further, the portable terminal 70 receives the job ID from the print intermediation server 100, but does not need to receive the thumbnail image data. Consequently, it is possible to reduce a communication load between the portable terminal 70 and the print intermediation server 100.

(Correspondence Relationship)

The portable terminal 70, the print intermediation server 100, and the generating server 110 are an example of "information processing device", "first server", and "second server", respectively. The printer application is an example of "computer-readable instructions for an information processing device" that may be stored in a non-transitory computer-readable storage medium. The file, the property information, the job ID, and the job name of FIG. 2 are an example of "particular file", "file information", "identification information", and "name", respectively. The thumbnail image data stored in S28 of FIG. 2 is an example of "thumbnail image data". The three items of property information P1 to P3, the three items of job ID "xxx" to "zzz", the three job names "AAA" to "CCC", the three items of status information ST1 to ST3, and the three items of thumbnail image data T1 to T3 in FIG. 3 are an example of "K items of file information", "K items of identification information", "K items of names", "K items of status information" and "K items of thumbnail image data", respectively. In FIG. 3, the thumbnail image selected in S107, the job ID "xxx", the property information P1, and the file F 1 are an example of "target thumbnail image", "target identification information", "target file information" and "target file", respectively. In FIG. 5, the two items of property information P2, P3, and the two items of job ID "yyy", "zzz" are an example of "(K-N) items of file information" and "(K-N) items of identification information", respectively. Further, in FIG. 7, the two items of job ID "xxx", "yyy", and the two items of thumbnail image data T1, T2 are an example of "M items of identification information", and "M items of thumbnail image data", respectively. Further, in FIG. 7, the one job ID "www" is an example of "(K-M) items of identification information".

JPEG is an example of "predetermined file format". The submit operation of S10 of FIG. 2, the job list displaying operation of S100 of FIG. 3, and the job list displaying operation of S300 of FIG. 5 are an example of "file selecting operation", "first access operation", and "second access operation", respectively. The submit request of S12 of FIG. 2, the job list request of S102 of FIG. 3, and the job list request of S302 of FIG. 5 are an example of "registering request", "first access request" and "second access request", respectively.

Second Embodiment; FIG. 8

Next, a submit process of the second embodiment will be described with reference to FIG. 8, focusing on points differing from the first embodiment of FIG. 2. In S600, a user of a portable terminal 70 activates a printer application.

In S602, a CPU 82 of the portable terminal 70 determines whether an image displaying operation has been performed by the user of the portable terminal 70 or not. The image displaying operation includes selecting a button indicating "Display" on a screen displayed in accordance with the printer application, and selecting one file from among three files F1 to F3 in memory 84. In a case where the image displaying operation has been performed by the user, the CPU 82 determines YES in S602, and proceeds to S604.

In S604, the CPU 82 of the portable terminal 70 generates image data for displaying from a selected file. The image data for displaying is data representing an image the same as the image represented by the selected file, and is data having a data size smaller than the selected file. Then, in S605, the CPU 82 stores the generated image data for displaying in the memory 84. Next, in S606, the CPU 82 retrieves the image data stored in the memory 84, supplies the image data for displaying to a displaying unit 74, and causes the displaying unit 74 to display an image represented by the image data for displaying. By looking at the image, the user of the portable terminal 70 can learn the file that is the target of the submit operation, i.e., the contents of the file that is to be registered in the print intermediation server 100.

Next, in S608, the CPU 82 of the portable terminal 70 generates thumbnail image data from the image data for displaying in the memory 84. The thumbnail image data is data representing an image the same as the image represented by the image data for displaying, and is data having a data size smaller than the image data for displaying. As described above, the data size of the image data for displaying generated in S604 is smaller than the data size of the file selected in S602. Consequently, processing load for generating thumbnail image data is lower in the case of generating thumbnail image data from the image data for displaying than in the case of generating thumbnail image data from the selected file. Thus, in the present embodiment, the CPU 82 can generate thumbnail image data while reducing the processing load.

Moreover, in the present embodiment, the data size of the thumbnail image data is smaller than the data size of the image data for displaying. However, in a modification, the data size of the thumbnail image data may be the same as the data size of the image data for displaying. That is, the thumbnail image data and the image data for displaying may be the same. In this case, since the image data for displaying stored in S605 becomes the thumbnail image data, the process of S608 can be omitted.

In S610, the CPU 82 of the portable terminal 70 receives a submit operation. Since a file has already been selected in S602, the submit operation of S610 does not include selection of a file, but does include selection of a button indicating "Submit", input of a job name, and selection of a print setting.

On the other hand, in a case where the submit operation is performed without the image displaying operation being performed by the user, the CPU 82 of the portable terminal 70 determines NO in S602, skips S604 to S610, and proceeds to S614. As with the submit operation of S10 of FIG. 2, this submit operation includes selection of a button indicating "Submit", selection of a file, input of a job name, and selection of a print setting.

S614, S616 are the same as S12, S14 of FIG. 2. In S618, the CPU 82 of the portable terminal 70 determines whether thumbnail image data has been generated or not. That is, in a case where S608 has been executed, the CPU 82 determines YES in S618, and proceeds to S620. On the other hand, in a case where S608 has not been executed (i.e., in the case of NO in S602), the CPU 82 determines NO in S618, and proceeds to S622. S620, S622 are the same as S28, S30 of FIG. 2.

Effect of Second Embodiment

According to the present embodiment, the portable terminal 70 generates the image data for displaying by using the file selected by the image displaying operation (S604), stores the image data for displaying in the memory 84 (S606), and displays the image represented by the image data for displaying (S608). Then, the portable terminal 70 generates the thumbnail image data by using the image data for displaying in the memory 84 (S608). Thereby, in a case where the image displaying operation is to be performed, the portable terminal 70 can reduce the processing load for generating the thumbnail image data.

In the present embodiment, the portable terminal 70 generates the thumbnail image data (S608) in the case where the image displaying operation is performed by the user (YES in S602), and does not generate the thumbnail image data in the case where the image displaying operation is not performed by the user (NO in S602). The file that is the target of the image displaying operation can be considered a file important to the user. Therefore, it is possible to generate only thumbnail image data related to the file important to the user. Thereby, it is possible to reduce the processing load for generating thumbnail image data. In the present embodiment, the image displaying operation of S602 of FIG. 8 is an example of "file selecting operation".

(Modification 1) In the first embodiment above, in the initial state of FIG. 3, the submit operation has been performed three times. However, the submit operation may not be executed three times, but may be executed once or twice, or may be executed four or more times. That is, "K" may be an integer of one or more.

(Modification 2) In FIG. 2 above, one file is selected in the submit operation (S10), and a submit request and the one file is sent to the print intermediation server 100 (S12). In a modification, two or more files may be selected in the submit operation (S10), and a submit request and the two or more files may be sent to the print intermediation server 100 (S12). That is, the "particular file" may be two or more files.

(Modification 3) In FIG. 2 above, the submit request and job information (i.e., property information) of S12 include the job name. However, in a modification, the submit request and job information may not include a job name. In this case, the property information P1 to P3 included in the job list of S104 of FIG. 3 does not include a job name. Consequently, a job name is not included in the job selecting screen displayed in S106. That is, the "registering request" and "file information" may not include a "name". Further, the "information processing device" may not receive the "K items of names", and may not cause the display of the "K items of names".

(Modification 4) In FIG. 8 above, the portable terminal 70 generates the image data for displaying from the selected file (S604). However, instead of this, a file may be sent to the generating server 110, and the image data for displaying may be received from the generating server 110. That is, "obtaining image data for displaying" may be realized by generating "image data for displaying" or may be realized by receiving "image data for displaying".

(Modification 5) In FIG. 2 above, the portable terminal 70 may be able to generate thumbnail image data from the selected file when the format of the selected file is any format (e.g., JPEG, GIF, PNG, PDF, DOC). In this modification, the "second server" can be omitted. Further, in another modification, the portable terminal 70 may send the selected file to the generating server 110, and receive the thumbnail image data from the generating server 110 when the format of the selected file is any format. That is, "obtaining thumbnail image data" may be realized by generating "thumbnail image data" or may be realized by receiving "thumbnail image data".

(Modification 6) In FIG. 2 above, the portable terminal 70 can generate the thumbnail image data only in the case where the file format of the selected file is JPEG. That is, the "predetermined file format" is JPEG. However, the "predetermined file format" is not restricted to JPEG, but may be another format (e.g., GIF, PNG and the like). Further, the "predetermined file format" is not restricted to one file format, but may be two or more file formats.

(Modification 7) In the embodiments above, the printing of an image based on the file is executed by the printer 10, but may not be executed by the printer 10. That is, instead of the print intermediation server 100 configured to save a file to execute mediation of printing, a server may be provided which functions as a simple storage server. That is, the "information processing device" may not perform "receiving a thumbnail selecting operation", "sending a print executing instruction" and "deleting".

(Modification 8) In FIG. 5 above, the portable terminal 70 deletes only the one item of job information J1 from the memory 84 (S305). In a modification, for example, a situation can be considered in which, before the process of S305, printing of two images based on the two files F1, F2 has been executed by the printer 10, and the two items of job information J1, J2 have been deleted from the print intermediation server 100. In this case, in S305, the portable terminal 70 deletes the two items of job information J1, J2 from the memory 84. That is, "N" may be an integer of one or more and less than or equal to "K".

(Modification 9) The portable terminal 70 may execute a wireless communication and not access the Internet, or may execute a wired communication and access the Internet. Generally speaking, the "information processing device" may be any device capable of communicating with the "first server" via the Internet.

(Modification 10) The "information processing device" may not be the portable terminal 70 and may be a desktop PC or another device (e.g., a printer, scanner, multi-function device, television and the like).

(Modification 11) In the above embodiments, the CPU 82 of the portable terminal 70 executes a program in the memory 84 to implement each process in FIG. 2 to FIG. 8, etc. Instead, at least one process of the processes in FIG. 2 to FIG. 8 may be implemented by hardware such as a logic circuit.

What is claimed is:

1. A non-transitory computer-readable storage medium storing computer-readable instructions for an information processing device,
the computer-readable instructions, when executed by a processor of the information processing device, causing the information processing device to perform:
receiving a file selecting operation for selecting a particular file from among one or more files in a memory of the information processing device;
sending the selected particular file and a registering request to a first server via the Internet, the registering request indicating a request for registering file information in the first server, the file information being generated by the first server which received the registering request, the file information including identification information for identifying the selected particular file;
obtaining thumbnail image data of the selected particular file;
receiving the identification information from the first server via the Internet on a condition that the registering request has been sent to the first server;
storing the thumbnail image data and the identification information in the memory in association with one another;
receiving a first access operation for accessing K items of file information registered in the first server, while the K items of file information are registered in the first server, the K being an integer of one or more;
in response to receiving the first access operation, sending, to the first server via the Internet, a first access request for accessing the K items of file information registered in the first server;
in response to sending the first access request, receiving, from the first server, K items of the identification information included in the K items of file information registered in the first server; and
in response to receiving the K items of identification information, retrieving the K items of thumbnail image data stored in the memory in association with the K items of identification information and controlling a displaying unit of the information processing device to display a first screen including K items of thumbnail images represented by the retrieved K items of thumbnail image data.

2. The non-transitory computer-readable storage medium as in claim 1, wherein
the registering request further includes a name related to the selected particular file,
the file information further includes the name,
the computer-readable instructions, when executed by the processor of the information processing device, cause the information processing device to further perform:
in response to sending the first access request, receiving, from the first server, K items of names included in the K items of file information registered in the first server,
wherein in response to receiving the K items of identification information and the K items of names, the K items of thumbnail image data are retrieved, and the first screen including the K items of thumbnail images and the K items of names is displayed.

3. The non-transitory computer-readable storage medium as in claim 1, wherein
the computer-readable instructions, when executed by the processor of the information processing device, cause the information processing device to further perform:
obtaining display image data of the selected particular file;
storing the display image data in the memory; and
retrieving the display image data stored in the memory and controlling the displaying unit to display an image represented by the retrieved display image data,
wherein the thumbnail image data is obtained by using the display image data stored in the memory, and
the display image data is different from the thumbnail image data.

4. The non-transitory computer-readable storage medium as in claim 1, wherein
the thumbnail image data is obtained by generating the thumbnail image data from the selected particular file in a case where a file format of the selected particular file is a predetermined file format; and
the thumbnail image data is obtained by sending the selected particular file to a second server via the Internet and receiving the thumbnail image data from the second server via the Internet in a case where the file format of the selected particular file is not the predetermined file format.

5. The non-transitory computer-readable storage medium as in claim 1, wherein
the thumbnail image data and the identification information are stored in the memory in association with one another in a case where the thumbnail image data is obtained,
the identification information only is stored in the memory in a case where the thumbnail image data is not obtained, and
the first screen including the K items of thumbnail images is displayed in a case where the K items of thumbnail image data are stored in the memory in association with the K items of identification information;
the computer-readable instructions, when executed by the processor of the information processing device, cause the information processing device to further perform:
in a case where M items of thumbnail image data are stored in the memory in association with M items of identification information among the K items of identification information, in response to receiving the K items of identification information, retrieving the M items of thumbnail image data stored in the memory in association with the K items of identification information and controlling the displaying unit to display a second screen including the M items of thumbnail images represented by the retrieved M items of thumbnail image data and (K-M) items of predetermined images, the M being an integer of one or more and less than the K.

6. The non-transitory computer-readable storage medium as in claim 1, wherein
the computer-readable instructions, when executed by the processor of the information processing device, cause the information processing device to further perform:
receiving a thumbnail selecting operation for selecting a target thumbnail image from among the K items of thumbnail images included in the first screen displayed on the display unit; and
in response to receiving the thumbnail selecting operation, sending a print executing instruction to a printer, the print executing instruction including target identification information stored in the memory in association with target thumbnail image data representing the target thumbnail image.

7. The non-transitory computer-readable storage medium as in claim 6, wherein
the computer-readable instructions, when executed by the processor of the information processing device, cause the information processing device to further perform:
receiving a second access operation for accessing (K-N) items of the file information registered in the first server, the N being an integer of one or more and less than or equal to the K;
in response to receiving the second access operation, sending, to the first server via the Internet, a second access request for accessing the (K-N) items of file information registered in the first server, and receiving (K-N) items of the identification information included in the (K-N) items of file information from the first server; and
in response to receiving the (K-N) items of identification information under a state where the K items of identification information and the K items of thumbnail image data are stored in the memory, deleting, from the memory, N items of the identification information among the K items of identification information and N items of the thumbnail image data among the K items of thumbnail image data, the N items of identification information excluding the (K-N) items of identification information, the N items of thumbnail image data excluding (K-N) items of the thumbnail image data associated with the (K-N) items of identification information.

8. The non-transitory computer-readable storage medium as in claim 6, wherein
each of the K items of file information further includes status information indicating a progress status of print of an image based on a file identified by identification information in the file information,
the computer-readable instructions, when executed by the processor of the information processing device, cause the information processing device to further perform:
in response to sending the first access request, receiving, from the first server, K items of the status information included in the K items of file information,
in response to receiving the K items of identification information and the K items of status information, the K items of thumbnail image data are retrieved, and the first screen including the K items of thumbnail images in a various manner in accordance with the K items of status information is displayed.

9. An information processing device comprising:
a displaying unit;
a processor; and
a memory storing computer-readable instructions therein, the computer-readable instructions, when executed by the processor, causing the information processing device to perform:
receiving a file selecting operation for selecting a particular file from among one or more files in the memory;
sending the selected particular file and a registering request to a first server via the Internet, the registering request indicating a request for registering file information in the first server, the file information being generated by the first server which received the registering request, the file information including identification information for identifying the selected particular file;
obtaining thumbnail image data of the selected particular file;
receiving the identification information from the first server via the Internet on a condition that the registering request has been sent to the first server;
storing the thumbnail image data and the identification information in the memory in association with one another;
receiving a first access operation for accessing K items of file information registered in the first server, while the K items of file information are registered in the first server, the K being an integer of one or more;
in response to receiving the first access operation, sending, to the first server via the Internet, a first access request for accessing the K items of file information registered in the first server;
in response to sending the first access request, receiving, from the first server, K items of the identification information included in the K items of file information registered in the first server; and
in response to receiving the K items of identification information, retrieving the K items of thumbnail image data stored in the memory in association with the K items of identification information and controlling the displaying unit to display a first screen including K items of thumbnail images represented by the retrieved K items of thumbnail image data.

* * * * *